(12) United States Patent
Hyman et al.

(10) Patent No.: US 6,446,256 B1
(45) Date of Patent: Sep. 3, 2002

(54) EXTENSION OF PARSABLE STRUCTURES

(75) Inventors: Michael I. Hyman, Seattle; Phani K. Vaddadi, Issaquah, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/344,287

(22) Filed: Jun. 30, 1999

(51) Int. Cl.[7] ................................................ G06F 9/45
(52) U.S. Cl. ........................ 717/143; 717/115; 717/116; 717/140; 717/141; 717/142; 717/147; 717/165; 707/513; 707/515; 707/516; 707/524
(58) Field of Search ............................ 717/8, 1, 4, 10, 717/141, 143, 131, 165, 115, 116, 140, 142; 707/513, 516, 515, 524

(56) References Cited

U.S. PATENT DOCUMENTS

| | | | | |
|---|---|---|---|---|
| 6,083,276 A | * | 7/2000 | Davidson et al. | 717/1 |
| 6,253,239 B1 | * | 6/2001 | Shklar et al. | 709/217 |
| 6,289,501 B1 | * | 9/2001 | Mutschler, III | 707/513 |
| 6,366,934 B1 | * | 4/2002 | Cheng et al. | 707/200 |
| 6,381,743 B1 | * | 4/2002 | Mutschler, III | 707/104.1 |

OTHER PUBLICATIONS

Art Sulger, "Extending REXX with C++", Dr. Dobbs Journal, ACM, pp. 1–13, Sep. 1994.*
Sean McGrath, "Rendering XML Documents Using XSL", Dr. Dobbs Journal, ACM, pp. 1–11, Jul. 1998.*
Royappa, "Implementing Catalog Clearinghouses with XML and XSL", pp. 616–623, Mar. 1999.*
Cowlishaw, "NetRexx—An Alternative For Writing Java Classes", IEEE, pp. 200–205, Feb. 1997.*

* cited by examiner

*Primary Examiner*—Gregory Morse
*Assistant Examiner*—Ted T. Vo
(74) *Attorney, Agent, or Firm*—Banner & Witcoff, Ltd.

(57) ABSTRACT

A bilateral interface may comprise an object interface and, optionally, a language interface. The object interface comprises at least an object-side object interface to be included in an external object, and a structure-side object interface to be included in a parsable structure. When executed, an object initialization routine included in the object-side object interface provides an identification of the structure-side object interface to the external object. Conversely, a structure initialization routine included in the structure-side object interface provides an identification of at least one object interaction routine to the external object. The external object can then invoke the at least one object interaction routine to interact with the parsable structure. The language interface is similarly constructed. The bilateral interface of the present invention provides much greater extensibility for parsable structures than was previously possible and provides, for example, for the addition of customized keywords.

11 Claims, 7 Drawing Sheets

EXTENSION OF PARSABLE STRUCTURES

TECHNICAL FIELD

The present invention relates generally to computer-readable, parsable structures and, in particular, to the extension of parsable structures using external objects that communicate with the parsable structure via a bilateral interface.

BACKGROUND OF THE INVENTION

Various computer languages are well known in the art. For example, there are so-called "markup" languages that provide a method of adding information to text in a computer-displayed document indicating the logical components of the document, or that provide instructions for the layout of text on the page or other information that can be interpreted by a computer. A particular example of a markup language is the so-called Extensible Markup Language (XML) that, in essence, makes data self-describing. XML provides a standardized approach that allows programmers to surround information with markup (i.e., "tags") that describes what the data is, not just what it should look like or where it should be positioned. Using XML, documents can be created that are easily processed by computers that follow the relatively simple rules for interpreting XML "code". To this end, an XML parser (an algorithm or program to determine the syntactic structure of a sentence or string of symbols written in some language) can be used to break down an XML document into a representation that a computer can understand.

A further feature of XML is the use of so-called "schemas". Schemas are an example of meta-data (data that describes other data), and are used in XML in part to describe the proper syntax for a document. For example, a schema can describe which records are permitted in a given database, which fields can be in a given record, what data types are allowed for a given field, etc. Using a schema included in a document, an XML parser can ensure that the remainder of the document follows the rules set forth in the schema. This is useful to ensure that a given document conforms to an agreed-upon format.

XML markup and schemas are powerful tools to programmers. However, specific XML grammars are not currently extensible. For example, there is an XML grammar called XML Stylesheet Language (XSL) that is used for defining document conversion. An XSL stylesheet can take one XML document and convert it to something else, by processing the various nodes in the XML source document. For example, a simple XML database could be converted to a Hypertext Markup Language (HTML) page that would display the information in the database. XSL operates by having a program that reads and then interprets the XSL commands. Today, the set of commands is fixed and the functionality expressible by the language is therefore fixed. Likewise, XML schemas are extensible in the sense that the schema language is language for describing a very broad set of document structures. Like XSL, however, the keywords used in the schema description are fixed and functionality expressed by the schema is therefore fixed.

Traditional programming languages (and declarative languages such as XSL) typically provide extensibility either through classes or objects, as known in the art. For example, a C++ programmer can create a new class containing functionality. That class can be instantiated within a program and used. Alternatively, a programmer using the "VISUAL BASIC" development system can add an Object Linking and Embedding (OLE) custom control (OCX; often referred to as ActiveX controls) to a program and call the methods available on the OCX. These functions and controls, while useful, only perform a specific function and return when executed. They do not allow a developer to alter program execution and flow.

Many languages provide a fixed set of symbols (such as "for", "while", "if", etc.) often referred to as keywords that do allow a developer to control the execution and flow within a program and to manipulate (assign, compare, etc.) data. Keywords are what form a programming language. For example, C++ is a collection of keywords and their associated behavior (for, while, if, etc.); likewise, BASIC is a collection of keywords and their associated behavior (FOR, SELECT, IF, etc.). However, because the set of keyword symbols is fixed, developers are restricted to the functionality provided by the fixed set. Although additional functionality can be added by virtue of functions and controls, they are not capable of altering execution and flow of a program as noted above. This is illustrated by the following example.

Assume, for example, that a programmer wants to create a loop that would go through the first four records in a database for people named Fred, and then process them in some manner. Such code could be written as shown in Table 1.

TABLE 1

```
cnt = 0;
foo = nextRecord();
while (cnt < 4 && foo) {
    if (foo.name == "Fred") {
        processData();
        printData();
        cnt++;
    }
    foo = nextRecord();
}
```

The code set forth in Table 1 sets forth an example of specialized looping capability defined by a particular "while" loop, although any number of processing steps (e.g., "processData( )" and "printData( )") could be performed within the loop. Now further assume that this functionality needs to be provided to other developers. Optimally, one would want to provide the functionality for everything but the processing steps, as shown in Table 2.

TABLE 2

```
FredWhile {
    processData();
    printData();
}
```

As used in Table 2, "FredWhile" functions as a keyword, i.e., a customized version of the typical "while" keyword. The looping capability has been made generic in the form of the "FredWhile"0 keyword, while still providing the flexibility to perform any number of processing steps within the loop. Stated another way, the "FredWhile" customized keyword represents a new way in which a programmer can alter program execution and flow. However, programmers are currently unable to provide such customized functionality in this manner. The best one can do using current techniques is to pass function pointer arguments, as illustrated in Table 3.

TABLE 3

```
function FredWhile(function *p1, function *p2) {
    cnt = 0;
    foo = nextRecord();
    while (cnt < 4 && foo) {
        if (foo.name == "Fred") {
            *p1();
            *p2();
            cnt++;
        }
        foo = nextRecord();
    }
}
```

In the example shown in Table 3, the looping capability has been made generic through the provision of the "FredWhile" function. However, it is limited to two pointer argument inputs (*p1 and *p2) and therefore has little flexibility in the number of processing steps that can be performed within the loop. This could be extended using variable argument lists, but that is also problematic. Furthermore, neither approach works well with general contained logic, where one might want additional execution flow to determine which contained functions execute.

Thus, it would be advantageous to provide a technique whereby parsable structures (such as XML trees or structures created in other languages) can be extended to include external objects providing additional functionality. Furthermore, a need exists for a technique that enables programmers to define and use customized keywords.

SUMMARY OF THE INVENTION

The present invention provides a technique for extending parsable structures to include external objects. The present invention also facilitates the addition of customized keywords to parsable structures. To this end, a bilateral interface is provided. The bilateral interface may comprise an object interface and, optionally, a language interface. The object interface comprises at least an object-side object interface to be included in an external object, and a structure-side object interface to be included in a parsable structure. The inclusion of the object-side object interface in an external object indicates that the object is suitable for inclusion in a parsable structure comprising the structure-side object interface. When executed, an object initialization routine included in the object-side object interface provides an identification of the structure-side object interface to the object. Conversely, a structure initialization routine included in the structure-side object interface provides an identification of at least one interaction routine to the object. The external object can then invoke the at least one interaction routine to interact with the parsable structure.

The language interface is similarly constructed comprising an object-side language interface included in the external object and a structure-side language interface included in the parsable structure. A language initialization routine within the object-side language interface provides an identification of the structure-side language interface to the external object. Once the structure-side language interface has been identified to the external object, an execution routine resident in the object-side language interface can invoke at least one language interaction routine resident in the structure-side language interface.

In this manner, the present invention provides much greater extensibility for parsable structures than was previously possible. Using these techniques, programmers can add customized keywords, thereby significantly increasing the flexibility of a given computer language. As known in the art, language engines have several pieces: a parser for reading through the language, and a compiler or interpreter for executing the language. The present invention provides a means by which external objects can interact with a language engine during these various phases so as to implement new keywords and new functionality previously unanticipated. For example, with regard to XSL, the present invention allows new keywords to be added. With regard to schemas, the present invention provides for the addition of new validation. This interaction can occur during a parse, compilation or interpretive execution stage.

DETAILED DESCRIPTION OF THE INVENTION

Figure 1:
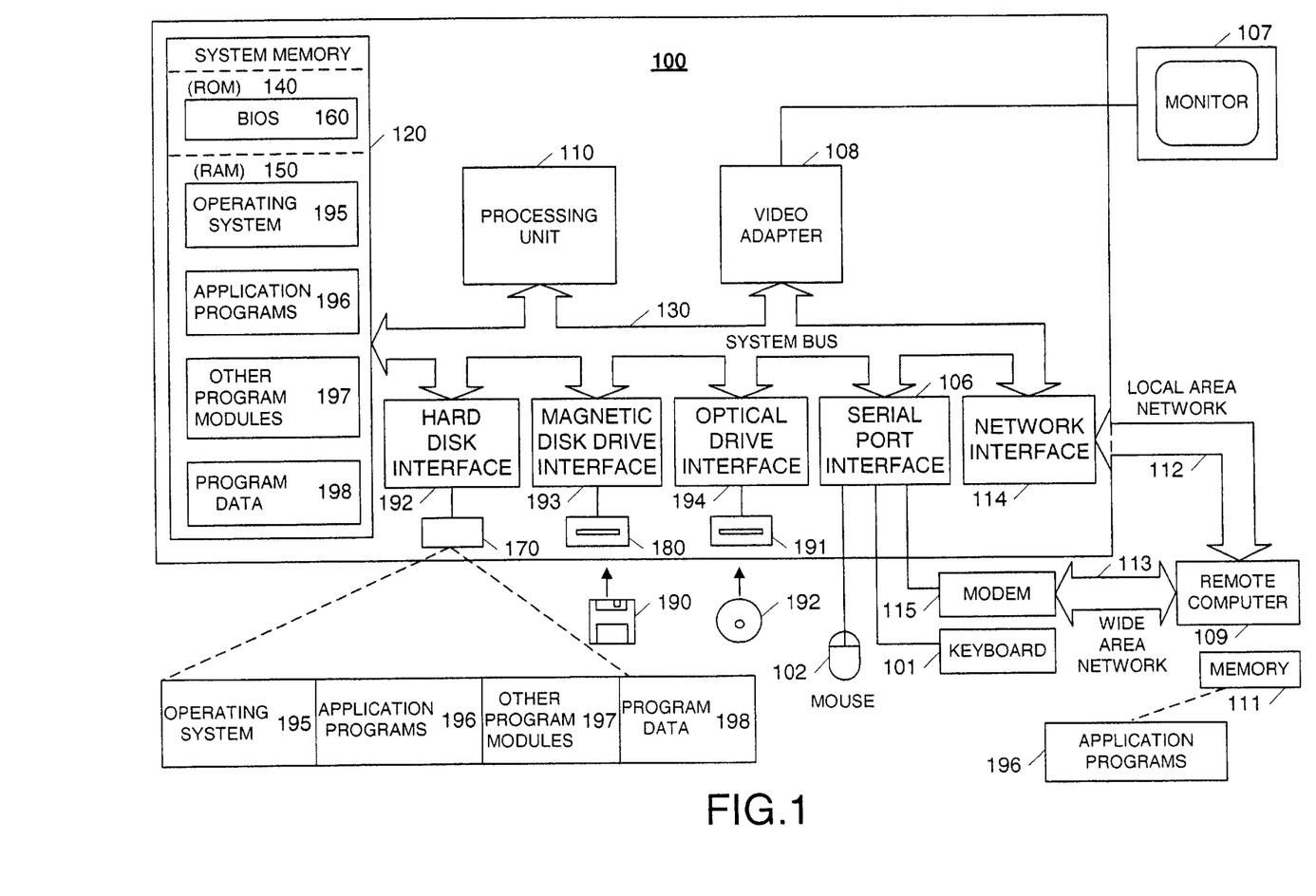
FIG. 1 is a schematic block diagram of a conventional general-purpose digital computing environment that may be used to implement various aspects of the present invention.

The present invention may be more fully described with reference to FIGS. 1–9. FIG. 1 is a schematic diagram of a conventional general-purpose digital computing environment that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input or selection devices, such as a keyboard 101 and a pointing device 102. The pointing device 102 may comprise a mouse, touch pad, touch screen, voice control and activation or other similar devices. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

Computer 100 can operate in a networked environment using logical connections to one or more remote computers, such as a remote computer 109. Remote computer 109 typically includes at least some of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 and remote computer 109 may both include a modem 115 or other means for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

It will be appreciated that the network connections shown are exemplary and other means of establishing a communications link between the computers can be used. The existence of any of various well-known protocols, such as TCP/IP, "ETHERNET", FTP, HTTP and the like, is presumed, and the system can be operated in a client-server configuration, as known in the art.

Figure 2:
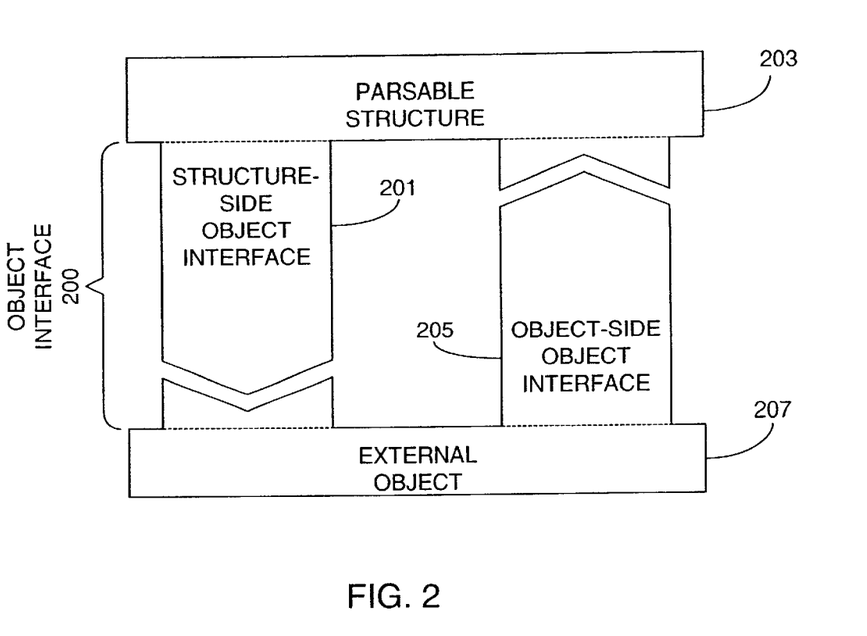
FIG. 2 is a schematic diagram illustrating a bilateral interface in accordance with the present invention.
Figure 3:
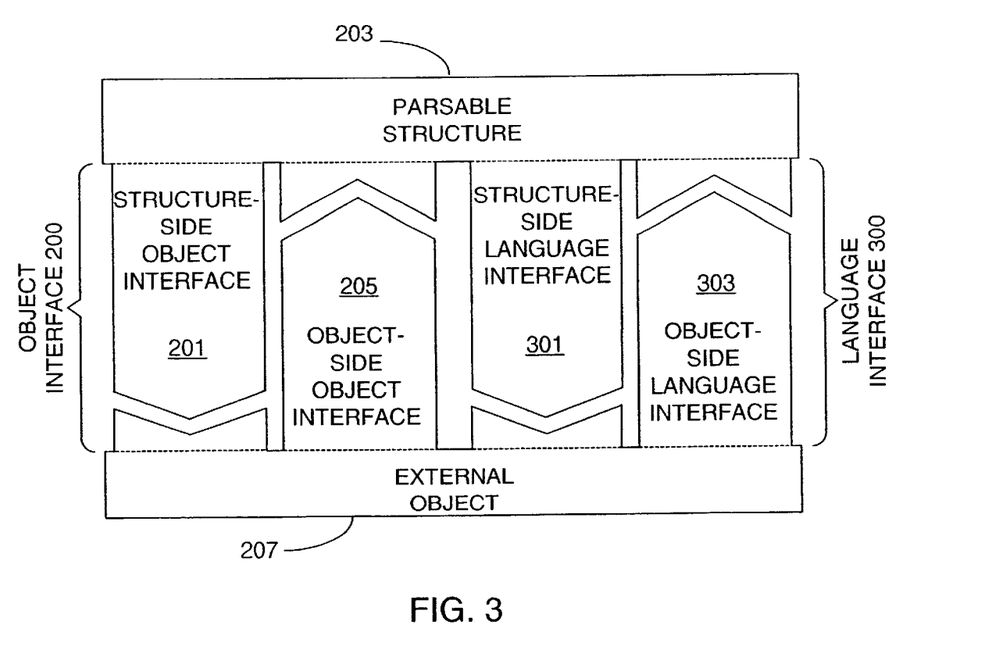
FIG. 3 is a schematic diagram illustrating another bilateral interface in accordance with the present invention.

Referring now to FIGS. 2 and 3, there are illustrated two embodiments of a bilateral interface in accordance with the present invention. An object interface 200 is illustrated in FIG. 2, whereas the object interface 200 and a language interface 300 are illustrated in FIG. 3. An object interface is generally used to provide a connection between an external object and a parsable structure such that the external object can not only exchange information with the parsable structure, but also have access to and be able to modify the parsable structure, and vice versa. When provided, a language interface builds upon an object interface to provide additional language-specific functionality between an external object and a parsable structure. In the context of the present invention, the terms "parsable structure" and "structure" are used interchangeably and encompass all information structures that are either directly computer-readable, or may be operated upon—typically, through the use of parsers, compilers and the like—to render them computer-readable. Examples include machine code and/or source code, or code capable of execution by an interpreter. The term "external object", in the context of the present invention, is defined to be any user-created, computer-executable functionality. Generally, a parser reads a parsable structure and creates a node from it. A node is an object that represents some portion of the parsable structure. As described in further detail below, a node connects (on behalf of the parsable structure) to an external object. Thus, references throughout the following description to a "parsable structure" or "structure" interfacing with an external object are to be read with the understanding that one or more nodes are created for a parsable structure, and it is these nodes that are coupled to external objects in accordance with the present invention.

As its name would imply, the bilateral interface is generally formed of at least two complementary components, an object-side interface and a structure-side interface. The modifiers "object-side" and "structure-side" are used to indicate which side of the bilateral interface a particular interface portion resides. This is illustrated in FIG. 2 where the object interface 200 comprises a structure-side object interface 201 provided by a parsable structure 203 and an object-side object interface 205 provided by an external object 207. The external object 207 consumes the structure-side object interface 201. Likewise, the object-side object interface 205 is consumed by the parsable structure 203. An object interface allows an external object to interact with a parsable structure. FIG. 3, in addition to the object interface 200, also illustrates a language interface 300 comprising a structure-side language interface 301 implemented by the structure 203, and an object-side language interface 303 implemented by the external object 303. A language interface extends the capability of a particular computer language, for example, through the addition of a customized keyword. Particular embodiments of the object and language interfaces are discussed below with regard to FIGS. 4–6. Although FIGS. 5 and 6 and the related text below describe particular examples of bilateral interfaces in accordance with the present invention, those having ordinary skill in the art will recognize that the teachings of the present invention are generally applicable to a wide variety of situations where it is desirable to provide extension to parsable structures.

Figure 4:
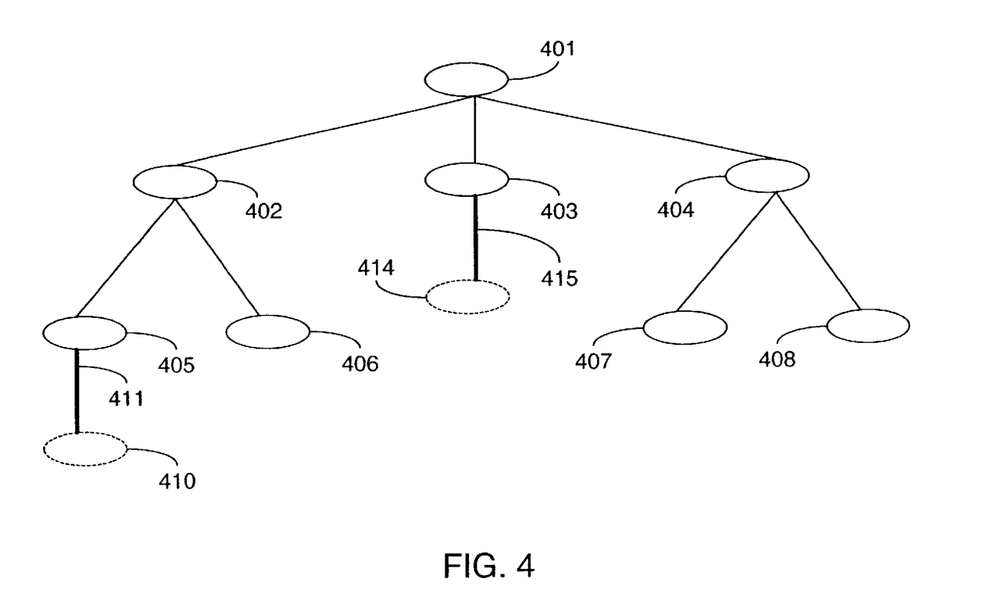
FIG. 4 illustrates the use of bi-lateral interfaces to extend an exemplary parsable structure in accordance with the present invention.

FIG. 4 illustrates an exemplary parsable structure in the form of a tree. Tree structures are well-known in the art and are not discussed in detail here. The tree structure shown comprises a plurality of nodes 401–408. For example, the tree structure shown may comprise an XML tree, where the nodes 401–408 possess a parent-child relationship to each other. XML trees are particularly useful because an object that has gained access to the tree can ascertain all of the various parent-child relationships and can modify elements within the tree accordingly.

FIG. 4 also illustrates two external objects 410, 414 coupled to two different nodes 405, 403 via bilateral interfaces 411, 415. If the XML tree includes an element with a special attribute set (for purposes of this discussion, this attribute is called "dt:plugin"), then the value of the attribute is treated as a unique identifier for (or reference to) an external object and instantiate that object into the XML tree. For example, assume that a portion of a parsable structure giving rise to the node labeled 405 comprises an element such as that shown in Table 4.

TABLE 4

<Element dt:plugin=" myplugin.1" />

In the example shown, the value of the attribute "dt:plugin" is "myplugin.1", which is subsequently used to reference an external object. An XML parser reads through the XML document and from that creates an internal data structure called the XML DOM tree, like that shown in FIG. 4. As it does so, when it encounters an element with the dt:plugin attribute set, it preferably creates a proxy node to implement those elements constituting external objects. It further instantiates that external object and asks it for the object-side object interface which, in this example, is called the IXMLBehavior interface. This is further illustrated in FIG. 5.

Figure 5:
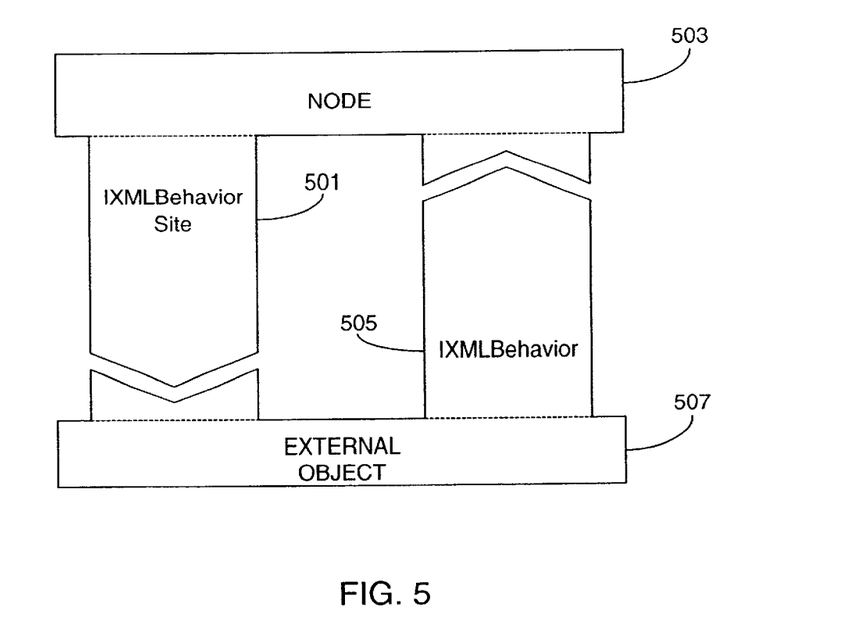
FIG. 5 is a schematic diagram illustrating one embodiment of a bilateral interface in accordance with the present invention for particular use in extending an XML tree.

As shown in FIG. 5, the external object 507 implements an IXMLBehavior interface 505. The existence of the IXMLBehavior interface 505 indicates that the external object 507 is suitable for coupling to the XML tree. In other words, the object 507 possesses the necessary interface that will allow it to interoperate with the structure, an XML tree in this instance. An exemplary implementation of IXMLBehavior is illustrated in Table 5.

TABLE 5

```
interface IXMLBehavior
{
    STDMETHOD(Init) (IXMLBehaviorSite *pBehaviorSite);
    STDMETHOD(Notify) (DWORD event, VARIANT *pvar)
    STDMETHOD(Detach) ();
};
```

The IXMLBehavior interface implements several methods. (In object-oriented languages, a method is the name given to a procedure or routine associated with one or more classes.) The "Init" method is an object initialization routine that is called by structure-side node to ascertain the identity of the structure-side object interface, shown as the IXMLBehaviorSite 501 in FIG. 5. In this implementation, when the node calls "Init", it passes to it the IXMLBehaviorSite pointer, i.e., a pointer that points to an appropriate address on the structure-side. As a result, the structure side knows how to talk to the external object (via IXMLBehavior) and the external object knows how to talk to the structure (via IXMLBehaviorSite); a process often referred to as a "handshake". The "Detach" method is used to cleanup resources just after the reference to the external object is severed, such as if the parsable structure is removed. Finally, the "Notify" method is a notification routine used to provide notification of events to an external object. For example, in a prototype of the present invention, only one event has been implemented by the "Notify" routine, i.e., to notify the object that the XML tree construction is complete and that the external object can now modify the tree, if necessary. Those having ordinary skill in the art will appreciate that there can be many additional notifications provided and the present invention is not limited in this regard.

As further illustrated in FIG. 5, a node 503 (forming a part of a parsable structure) implements IXMLBehaviorSite 501 as the structure-side object interface. In combination, the IXMLBehaviorSite interface 501 and the IXMLBehavior interface 505 form an object interface allowing interaction between the external object 507 and the node 503. As described in further detail below, structure-side object interfaces like the IXMLBehaviorSite interface 501 can be added to the structure when the appropriate attribute (such as "dt:plugin") is encountered. An exemplary implementation of IXMLBehaviorSite is illustrated in Table 6.

TABLE 6

```
interface IXMLBehaviorSite
{
    STDMETHOD(GetXMLDomNode) (IUnknown *ppunk);
};
```

In this example, only one method, "GetXMLDomNode", is implemented as a structure initialization routine. Generally, the structure initialization routine identifies to the external object at least one object interaction routine that may be accessed by the external object in order to interact with the parsable structure. In short, the structure initialization routine completes the connection between the node and the external object. In the example of Table 6, the "GetXMLDomNode" method will provide an identification of a so-called DomNode that includes one or more methods that allow an object to manipulate the properties of the node with which it is associated, as well as access the entire tree.

The present invention may also be advantageously employed in schemas. As noted above, a schema is a description of the syntax for a document. When an XML document has an associated schema, the parser will make sure that the document follows the rules of the schema. If the document does not follow the rules established by the schema, an error occurs. This is useful because it can verify that the document conforms to a particular desired structure.

Although verification against a known syntax and structure is useful, it often is not sufficient for verifying that a document meets business rules. Generally, a more complex set of logic is often applied to confirm that a document is valid in the sense that data contained therein conforms to real-world limitations. For example, one might check that the description is a known description, or that a product is in stock, or that an order doesn't exceed a credit limit. Validation in this manner is possible through use of the present invention.

Table 7 illustrates a sample schema incorporating the present invention.

TABLE 7

```
<?xml version="1.0" ?>
<Schema name="expense_report"
    xmlns="urn:schemas-microsoft-com:xml-data"
    xmlns:dt="urn:schemas-microsoft-com:datatypes">
<AttributeType name="id"/>
<ElementType name="description" dt:type="string"
content="textOnly"/>
<ElementType name="amount" dt:type="fixed.14.4"
content="textOnly"/>
<ElementType name="record" content="eltOnly" dt:plugin="CheckThis">
    <attribute type="id"/>
    <group minOccurs="1" maxOccurs="3">
<element type="description" />
    <element type="amount" />
    </group>
</ElementType>
</Schema>
```

This schema indicates that a file can contain a record element. The record element can have an attribute named "id". It can also have 1–3 occurrences of a description and amount. The description is a string. The amount is a fixed.14.4 (currency) type. However, the record element also includes an element having an attribute of an external object, i.e., "dt:plugin=CheckThis". Preferably, the object identified by the "CheckThis" reference comprises additional validation functionality. Using the object interface described above relative to FIG. 5 and Tables 5 and 6, the object has complete access to the entire tree, and thus can examine the XML tree to make sure the custom validity rules are met. The external object is instantiated and called during the validation phase of parsing, enabling new validation rules to be added.

Figure 6:
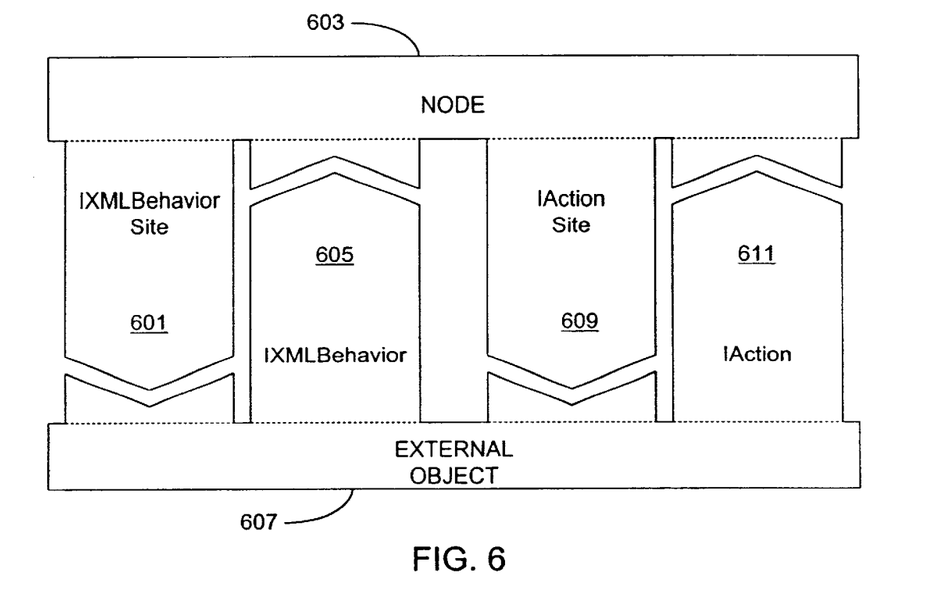
FIG. 6 is a schematic diagram illustrating another embodiment of a bilateral interface in accordance with the present invention for particular use in extending an XSL stylesheet.

As noted above, the bilateral interface of the present invention may also include a language interface that allows for the extension of computer languages. FIG. 6 illustrates a language interface suitable for use in extending the capabilities of an XSL stylesheet. In addition to an object interface comprising the above-described IXMLBehaviorSite and IXMLBehavior interfaces 601, 605, a language interface is also shown comprising an IActionSite interface 609 and an IAction interface 611. Together, the IActionSite interface 609 and the IAction interface 611 provide a means whereby additional functionality, including additional keywords, may be added to an XSL stylesheet. A node 603 forming a part of a parsable structure implements the IActionSite interface 609, and the IAction interface 611 is implemented by an external object 607. The IAction interface 611 is an object-side language interface that indicates that the external object 607 may include functionality that is suitable for extending a computer language. Similarly, the IActionSite 609 is a structure-side language interface that provides the functionality for the object to interact with the structure at the execution and flow control level of the structure. Exemplary implementations of IAction and IActionSite are illustrated in Tables 8 and 9, respectively.

TABLE 8

```
interface IAction
{
    STDMETHOD(InitAction) (IXTLActionSite *pactionsite,
        IXMLDOMNode
*pnodeXSL);
    STDMETHOD(Compile) ();
    STDMETHOD(Execute) (EnumState enumstate);
};
```

TABLE 9

```
interface IActionSite
{
    STDMETHOD(GetData) (IXMLDomNode **ppNode);
    STDMETHOD(CompileQuery) (BSTR bstrQuery);
    STDMETHOD(BeginElement) (EnumElementType eet, BSTR bstr);
    STDMETHOD(EndElement) (BSTR bstr);
    STDMETHOD(PushAction) (ENumAction enumAction)
    STDMETHOD(SetState) (EnumState enumstate)
};
```

The IAction and IActionSite interface each implement several methods. The "InitAction" routine is a language initialization routine and is the first routine executed. The "InitAction" routine ascertains values for two pointers that point to a structure-side language interface and to an XML DOM node. Stated another way, the language initialization routine identifies to the external object 607 those elements residing on the structure-side necessary to implement the language interface. The "Compile" routine is called when the XSL stylesheet is being compiled. While this is a specific implementation of the present invention, those having ordinary skill in the art will appreciate that the ability to specify a compile time interface can be applied to a broad variety of language engines (ranging from interpreted to compiled systems) in order to extend a language. That is, the "Compile" interface provides a way for the external object to provide compiled code for a compiler engine, or to provide interfaces by which a compiler can interact with the external object so as to generate compiled code. The "Compile" routine can in turn call the "CompileQuery" method on IActionSite to compile a select clause or other clause into a query that the template uses to find the next data in the XML tree.

The "Execute" method performs the work of a new keyword; it decides how to process a particular element. That is, when the IXSL parser finds a parsable structure, it can call the "Execute" method on the external object. The "Execute" method then processes the information associated with the parsable structure (using the handshake mechanism discussed above) and can perform some action. Those having ordinary skill the art will recognize that new keywords can therefore be introduced, and that these new keywords can interact with a computer language processor (such as an interpreter or a compiler) in a complete and rich fashion. The external object can inject or interact with a compile phase or with a direct execution phase. In the specific implementation illustrated in Table 9, additional methods such as "GetData" and "PushAction" are also provided. These methods interact with the state of the XSL processor. Although these interfaces are specific to an XSL implementation, those having ordinary skill in the art will understand that the external object can use methods such as these to interact with the parsing stage of a language engine, so as to control the type of intermediate definition language generated, or the type of stacks and state set up for an interpretive engine. As described above, the IActionSite interface implemented within the structure comprises language interaction routines ("GetData", "CompileQuery", etc.) that allow the object to function within the organization of the particular language being modified.

In a preferred embodiment, an XSL processing engine implements a proxy node for those elements that correspond to external objects. These proxy nodes implement the IActionSite. The XSL processing engine first calls "InitAction" on all extended keywords to identify the corresponding structure-side interfaces and potentially the XSL tree itself. The XSL processing engine then goes through a compile phase during which the XSL processing engine calls "Compile" on each of the keywords. For each extended keyword, the proxy calls the IAction interface's "Compile" method. This can, as previously noted, make use of the various service functions provided in the IActionSite. The XSL engine then starts executing the compiled keywords against the XML data input. The external objects can use the "BeginElement" and "EndElement" methods to initiate output to the output stream, e.g., to construct a new tree. The object can also indicate what kind of element it is outputting by using the "EnumElementType". Although the discussion of FIG. 6 describes a particular implementation, it is understood that the present invention encompasses a generic technique that compilers, interpreters and other language engines can use to incorporate new keywords. This is achieved by providing an interface with an external object that can interact meaningfully with the various stages of computer language processing.

Figure 7:
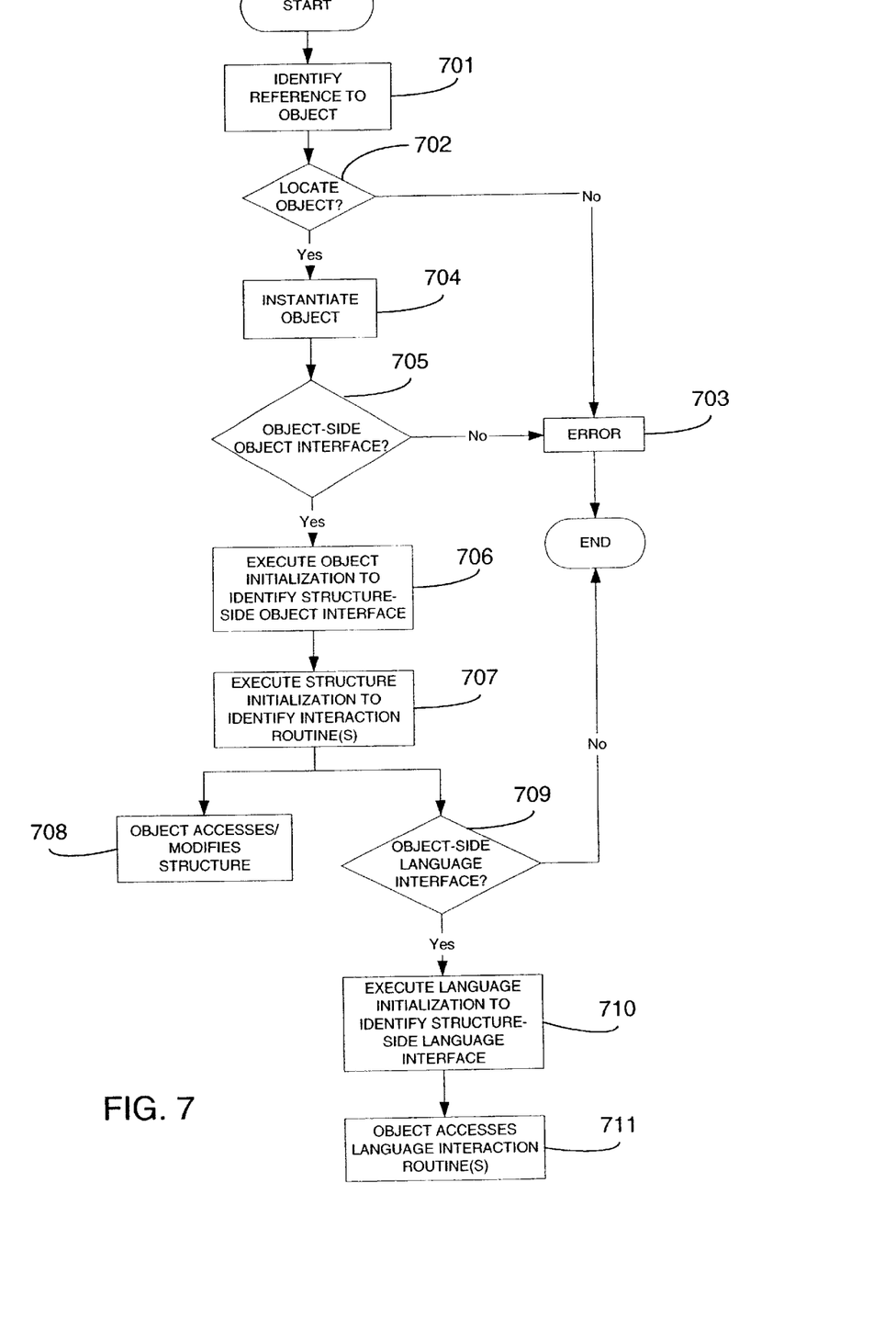
FIG. 7 is a flowchart illustrating a method for extending a parsable structure in accordance with the present invention.

Referring now to FIG. 7, there is illustrated a method for extending a parsable structure. Preferably, the method illustrated in FIG. 7 is implemented as computer-readable instructions stored in memory and executed by a suitable processing device. The method of FIG. 7 assumes that a parsable structure is being compiled or interpreted when, at step 701, a reference to an external object is detected by a parser. This occurs, for example, when an element having a predefined attribute, such as "dt:plugin", is encountered. Other identifiers are known in the art and may be similarly used. When the reference to an external object is found, it is then determined by the parser, at step 702, whether an external object uniquely corresponding to the identifier exists in the system. For example, where the computer executing the process illustrated in FIG. 7 is operating in accordance with a "WINDOWS" operating system, the registry is examined to see if the external object has been registered on the system. If the external object cannot be located, the process continues at step 703 where the parser generates an error message in accordance with known techniques.

Assuming, however, that the external object is located and its physical address identified, the process continues at step 704 where the object is instantiated by the parser, i.e., brought into existence and initialized as necessary. For example, referring to FIG. 4, this step would bring an object, such as the object identified by reference numeral 410, into existence. In a preferred embodiment, a proxy is also created at step 704. The proxy acts as a container for the structure-side object interface and, if desired or necessary, for the structure-side language interface. Where an XML implementation is used, for example, this would result in the creation within the XML tree of a proxy node implementing the appropriate structure-side interfaces.

At step 705, the instantiated external object is queried by the proxy node to determine whether it comprises the appropriate object-side object interface. For example, assume that a Component Object Model (COM) software architecture is being used in conjunction with the present invention. As known in the art, all objects within such an architecture comprise an "IDispatch" method that constitutes a generic entry point to each object. In this case, the "IDispatch" method is queried regarding the object-side object interface (e.g., the "IXMLBehavior" interface). Regardless of the particular implementation, if the necessary object-side object interface is not found, then an error is indicated at step 703. If the necessary object-side object interface is found, then processing continues at step 706.

At step 706, an object initialization routine, provided by the object-side object interface, is called by the proxy node to identify a structure-side object interface. For example, the "Init" routine discussed above relative to Table 5 is an object initialization routine. As a result of the object initialization routine, the entire bilateral object interface is completely specified in that the structure-side is aware of the object-side object interface, and the object-side is aware of the structure-side object interface. Processing then continues at step 707 where a structure initialization routine, provided by the structure-side object interface, is called by the external object to identify one or more object interaction routines resident in the structure. As described above, the external object uses the object interaction routine(s) to interact with the structure. This is shown at step 708 where the external object is able to access and modify the structure with which it is now associated. In this manner, the present invention provides extensibility in a manner unlike prior art techniques.

In addition to the steps described above, the method of FIG. 7 also provides for language extensions, particularly in the form of customized keywords. This is shown as a parallel path at steps 709–711. Steps 709–710 would be executed when a parser, compiler or interpreter encounters an external object, such as a customized keyword. In that case, at step 709, it is determined by the proxy node whether the external object comprises an object-side language interface. Again, various techniques exist whereby an external object can be queried as to the existence of a given interface. If the object-side language interface is not found, then the process ends (with or without an error indication, as dictated by design considerations). If, however, the object-side language interface is found, processing continues at step 710.

At step 710, a language initialization routine, provided by the object-side language interface, is called by the proxy node to identify a structure-side language interface. For example, the "InitAction" routine discussed above relative to Table 8 is a language initialization routine. As a result of the language initialization routine, the entire bilateral language interface is completely specified in that the structure-side is aware of the object-side language interface, and the object-side is aware of the structure-side language interface. The structure-side language interface comprises one or more language interaction routines that allow the external object to function within the organization of the particular language being modified, as discussed above relative to several exemplary embodiments. This is represented at step 711 where the external object accesses the language interaction routine(s) in order to provide the external object's customized functionality.

Figure 8:
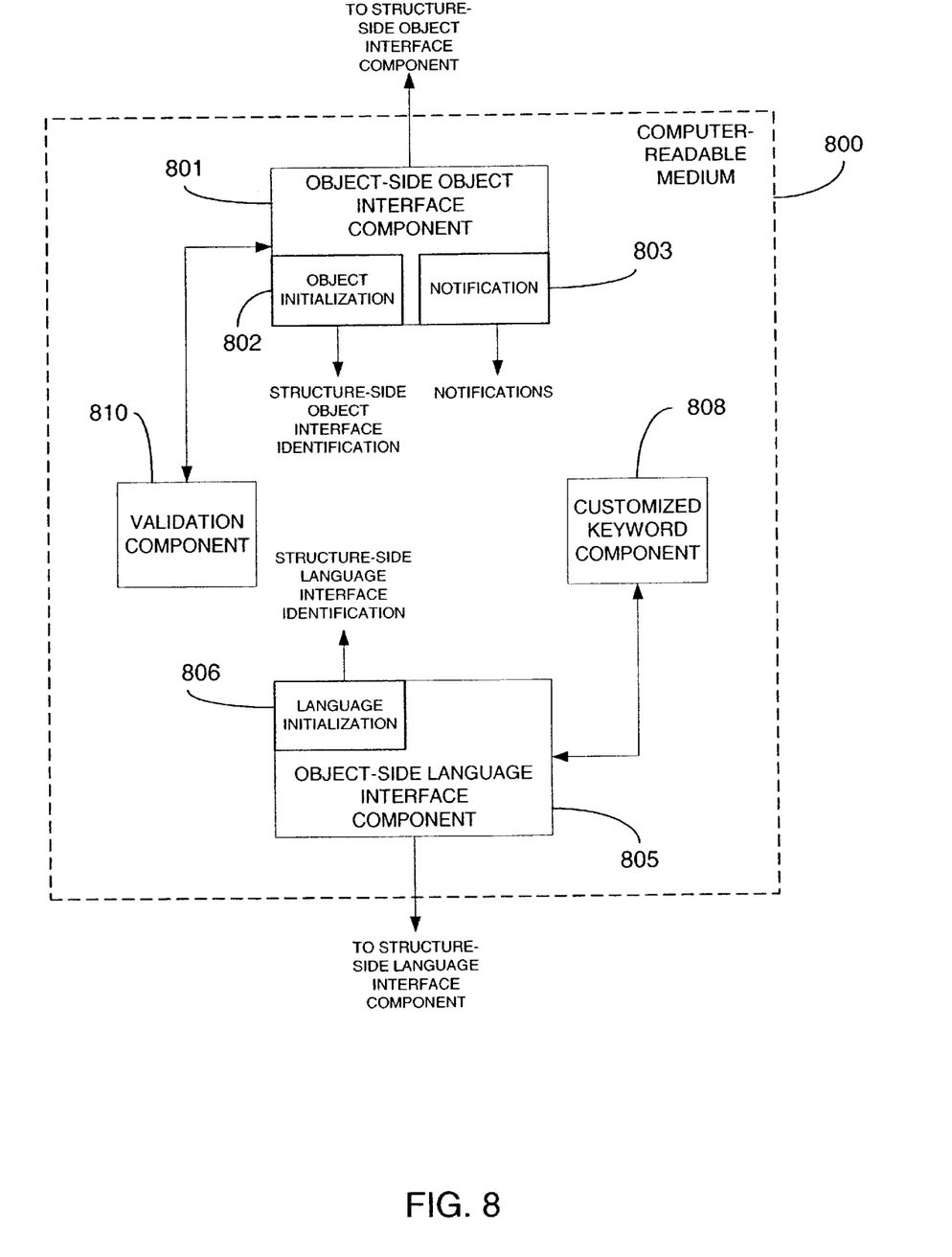
FIG. 8 is a schematic block diagram of an implementation of the present invention based on a computer-readable medium.
Figure 9:
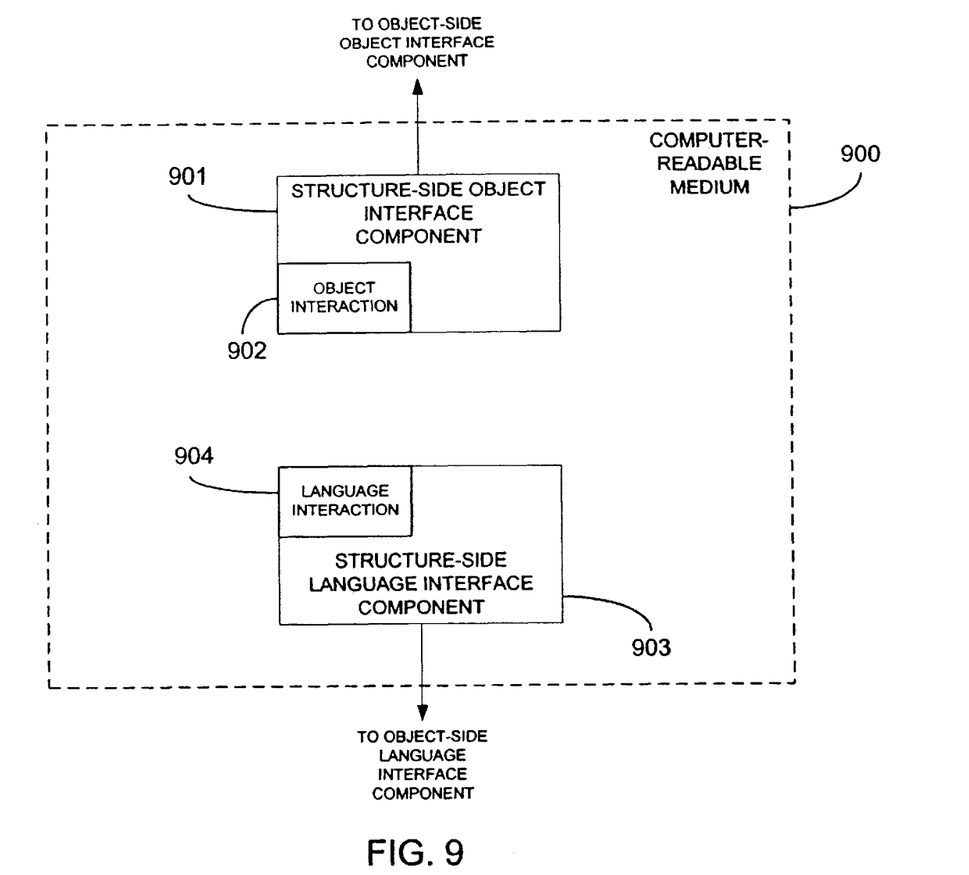
FIG. 9 is a schematic block diagram of another implementation of the present invention based on a computer-readable medium.

FIGS. 8 and 9 illustrate an embodiment of the present invention based on computer-readable media 800, 900. The computer-readable media 800, 900 may comprise hard disks, removable magnetic disks, optical disks, magnetic cassettes, flash memory cards, Bernoulli cartridges, RAMs, ROMs, and the like. It will be appreciated by those skilled in the art that other types of computer-readable media that can store data and/or computer-executable instructions that are accessible by a computer may also be used. Regardless, the computer-readable media provide nonvolatile storage of computer-readable instructions, data structures, program modules and other data.

Referring now to FIG. 8, there is illustrated a computer-readable medium 800 comprising computer-executable components suitable for enabling an external object to include itself in a parsable structure. At a minimum, the computer-readable medium 800 comprises an object-side object interface component 801. A validation component 810 may also be provided in conjunction with the object-side object interface component 801. Further still, an object-side language interface component 806 and a customized keyword component 808 may also be provided. Each of the components preferably comprises computer-executable instructions. As those having ordinary skill in the art will readily appreciate, various other component arrangements can be devised that encompass the same functionality.

The object-side object interface component 801 may also comprise various routines as shown. In particular, an object initialization routine 802 and a notification routine 803 are shown. Other object-side routines that may be included in the object-side object interface component 801 are not illustrated in FIG. 8. As described above, part of the function of the object-side object interface component 801 is fulfilled by its mere presence indicating that an external object (not shown) is suitable for coupling to a parsable structure. The object initialization routine 802 provides an identification of a structure-side object interface to the object and the notification routine 803 provides notifications to the object. Via the object-side object interface component 801, the validation component, comprising validation logic, may access one or more object interaction routines included in the structure-side object interface. When included, the object-side language interface 805 comprises at least a language initialization routine 806 that provides to the object an identification of a structure-side language interface, as described above. The customized keyword component 808 accesses, via the object-side language interface 805, one or more language interaction routines specified by the structure-side language interface.

Referring now to FIG. 9, there is illustrated a computer-readable medium 900 comprising computer-executable components suitable for enabling an external object be included in a parsable structure. At a minimum, the computer-readable medium 900 comprises a structure-side object interface component 901. A structure-side language interface component 903 may also be included. The structure-side object interface 901 and structure-side language interface 903 each provide a portion of the functionality of an object and language interface, respectively. Each of the components preferably comprises computer-executable instructions. As those having ordinary skill in the art will readily appreciate, various other component arrangements can be devised that encompass the same functionality.

The structure-side object interface 901 may also comprise various routines as shown. In particular, an object interaction routine 902 is shown, although more than one such routine may be provided. As described above, the object interaction routine(s) 902 allow an external object to access and manipulate a parable structure. When provided, the structure-side language interface 903 comprises at least one language interaction routine 904.

What has been described is merely illustrative of the application of the principles of the present invention. Other arrangements and methods can be implemented by those skilled in the art without departing from the spirit and scope of the present invention.

What is claimed is:

1. In a computer system capable of parsing a parsable structure, a method for coupling an external object to the parsable structure, the method comprising steps of:

identifying a reference to the external object in the parsable structure;

locating the external object based on the reference;

determining that the external object comprises an object-side object interface indicating that the external object is suitable for inclusion in the parsable structure, wherein the object-side object interface comprises an object initialization routine; and executing the object initialization routine to provide to the external object an identification of a structure-side object interface.

2. The method of claim 1, further comprising steps of:

executing a structure initialization routine forming a part of the structure-side object interface, wherein the structure initialization routine provides to the external object an identification of at least one object interaction routine that allows the external object to interact with the parsable structure.

3. The method of claim 1, further comprising steps of:

executing a notification routine forming a part of the object-side object interface to provide notifications to the external object.

4. The method of claim 1, wherein the parsable structure comprises an XML tree.

5. The method of claim 1, wherein the parsable structure comprises a schema.

6. The method of claim 1, wherein the parsable structure comprises an XSL stylesheet.

7. The method of claim 1, wherein the external object comprises an object-side language interface, the object-side language interface comprising a language initialization routine, the method further comprising a step of:

executing the language initialization routine to provide the external object an identification of a structure-side language interface that comprises at least one language interaction routine.

8. The method of claim 7, wherein the object-side language interface comprises an execution routine that accesses the at least one language interaction routine to implement customized keyword functionality included in the external object.

9. The method of claim 7, wherein the external object, via a bilateral interface comprising the object-side language interface and the structure-side language interface, provides compiled code to a compiler operating on the parsable structure.

10. The method of claim 7, wherein the external object, via a bilateral interface comprising the object-side language interface and the structure-side language interface, provides information regarding state manipulation to a parser operating on the parsable structure.

11. The method of claim 7, wherein the external object, via a bilateral interface comprising the object-side language interface and the structure-side language interface, provides information regarding at least one of execution implementation and runtime stack manipulation to an interpreter operating on the parsable structure.

* * * * *